(12) United States Patent
Karunaratne

(10) Patent No.: US 9,989,003 B2
(45) Date of Patent: Jun. 5, 2018

(54) METHODS AND SYSTEMS FOR IDENTIFYING INSUFFICIENT COMBUSTION BASED ON EXHAUST GAS CONTENT

(71) Applicant: General Electric Company, Schenectady, NY (US)

(72) Inventor: Milan Palinda Karunaratne, Anaheim, CA (US)

(73) Assignee: General Electric Company, Schenectady, NY (US)

( * ) Notice: Subject to any disclaimer, the term of this patent is extended or adjusted under 35 U.S.C. 154(b) by 293 days.

(21) Appl. No.: 14/478,038

(22) Filed: Sep. 5, 2014

(65) Prior Publication Data

US 2016/0069288 A1 Mar. 10, 2016

(51) Int. Cl.
| | |
|---|---|
| *F02D 41/14* | (2006.01) |
| *F02D 41/22* | (2006.01) |
| *F02D 35/02* | (2006.01) |
| *F02D 41/00* | (2006.01) |
| *F02M 25/07* | (2006.01) |

(52) U.S. Cl.
CPC .......... *F02D 41/146* (2013.01); *F02D 35/02* (2013.01); *F02D 41/0047* (2013.01); *F02D 41/22* (2013.01); *F02M 25/0755* (2013.01); *F02D 2200/1015* (2013.01); *Y02T 10/47* (2013.01)

(58) Field of Classification Search
CPC .............. F02D 41/0065; F02D 41/005; F02D 41/0052; F02D 21/08; F02D 41/0072; F02D 41/0077; F02D 41/0047; F02D 41/146; F02D 41/22; F02D 35/02; F02M 26/06; F02M 26/05; F02M 26/0755

USPC ......................................... 123/568.11–568.29
See application file for complete search history.

(56) References Cited

U.S. PATENT DOCUMENTS

| | | | |
|---|---|---|---|
| 4,936,277 A | 6/1990 | Deutsch et al. | |
| 6,076,502 A * | 6/2000 | Katashiba | F02D 21/08 123/435 |
| 8,229,655 B2 * | 7/2012 | Wang | F02D 35/023 701/111 |
| 8,813,723 B2 * | 8/2014 | Bagnasco | F02D 41/008 123/478 |
| 2006/0162689 A1 | 7/2006 | Winkelman et al. | |
| 2007/0186903 A1 * | 8/2007 | Zhu | F01N 3/2006 123/406.37 |
| 2008/0264036 A1 * | 10/2008 | Bellovary | F01N 3/00 60/274 |
| 2011/0137537 A1 * | 6/2011 | Leone | F02D 41/0027 701/102 |
| 2013/0118461 A1 * | 5/2013 | Mitchell | F02D 21/08 123/681 |

(Continued)

OTHER PUBLICATIONS

European Search Report and Opinion issued in connection with corresponding EP Application No. 15183789.5 dated Feb. 9, 2016.

*Primary Examiner* — Sizo Vilakazi
(74) *Attorney, Agent, or Firm* — GE Global Patent Operation; John A. Kramer

(57) ABSTRACT

Various methods and systems are provided for diagnosing a condition of a cylinder of an engine. In one example, a method includes adjusting recirculated exhaust gas responsive to a determined emission value and indicating insufficient combustion of one or more engine cylinders based on an amount by which the recirculated exhaust gas is adjusted.

20 Claims, 3 Drawing Sheets

(56) References Cited

U.S. PATENT DOCUMENTS

2014/0196697 A1\* 7/2014 Burrahm ............... F02M 26/43
                                                                                    123/568.11
2014/0311450 A1\* 10/2014 Minami ................. F02P 5/045
                                                                                    123/406.46

\* cited by examiner

METHODS AND SYSTEMS FOR IDENTIFYING INSUFFICIENT COMBUSTION BASED ON EXHAUST GAS CONTENT

BACKGROUND

Technical Field

Embodiments of the subject matter disclosed herein relate to engines. Other embodiments relate to engine diagnostics.

Discussion of Art

Engines including one or more engine cylinders may experience insufficient combustion during engine operation. Insufficient combustion may include failure of one or more engine cylinders to fire due to a degraded fuel injector or another degraded cylinder component. As a result of a non-combusting cylinder, engine operation may be degraded and eventually result in engine shutdown. For example, a degraded fuel injector may result in decreased fuel efficiency. Systems for detecting insufficient combustion may require additional engine sensors, thereby increasing engine costs and control complexity.

BRIEF DESCRIPTION

In one embodiment, a method (e.g., a method for controlling an engine system) comprises adjusting recirculated exhaust gas responsive to a determined emission value and indicating insufficient combustion of one or more engine cylinders based on an amount by which the recirculated exhaust gas is adjusted.

DETAILED DESCRIPTION

The following description relates to embodiments of adjusting recirculated exhaust gas responsive to a determined emission value and indicating insufficient combustion of one or more engine cylinders based on an amount by which the recirculated exhaust gas is adjusted. In one example, adjusting recirculated exhaust gas may include adjusting one or more valves positioned in an exhaust gas recirculation system routing exhaust from one or more engine cylinders and to an intake passage of an engine. In another example, the one or more engine cylinders may be a group of donor cylinders routing exhaust to the intake passage. A second group of non-donor cylinders may route exhaust to an exhaust passage of the engine. Additionally, the determined emission value may be a value of exhaust oxygen and/or exhaust NOx based at least partially on an output of an exhaust gas sensor positioned along the exhaust passage. Further, indicating insufficient combustion may include one or more of indicating cylinder cut out or a condition of one or more fuel injectors coupled to the indicated cylinder.

Figure 1:
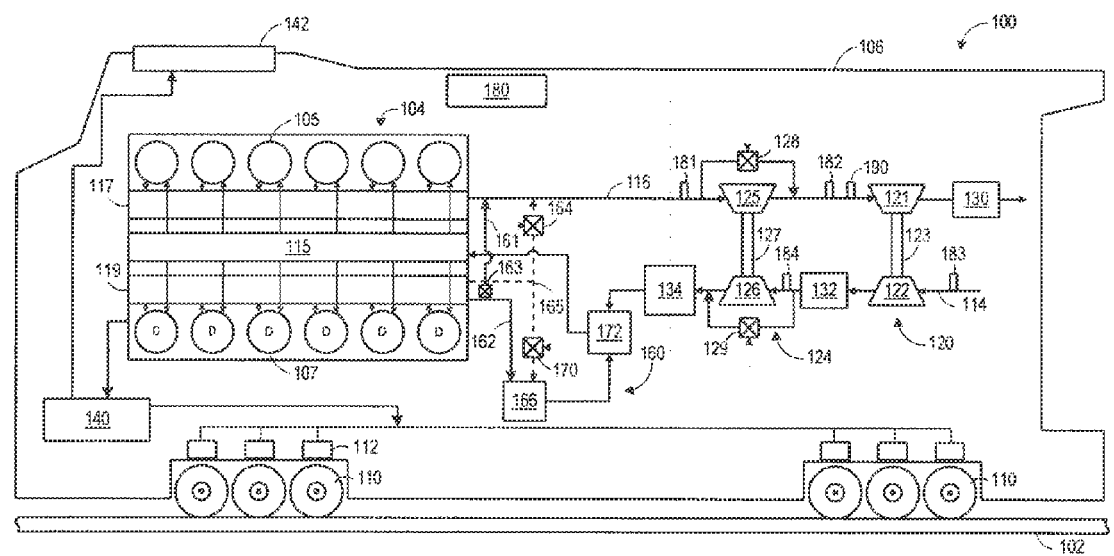
FIG. 1 shows a schematic diagram of a rail vehicle with an engine, according to an embodiment of the invention.
Figure 2:
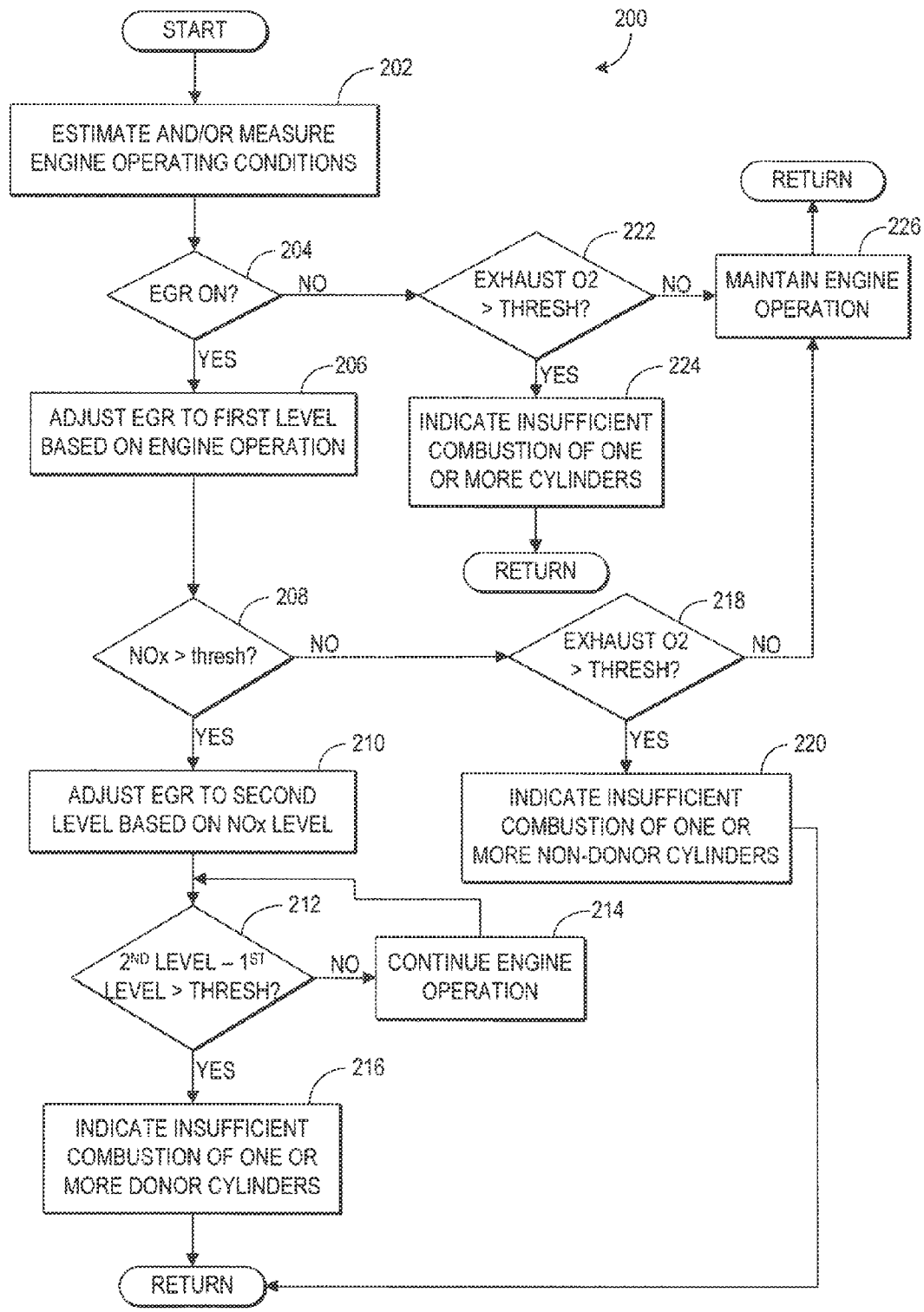
FIG. 2 shows a flow chart of a method for indicating insufficient combustion based on exhaust gas content, according to an embodiment of the invention.
Figure 3:
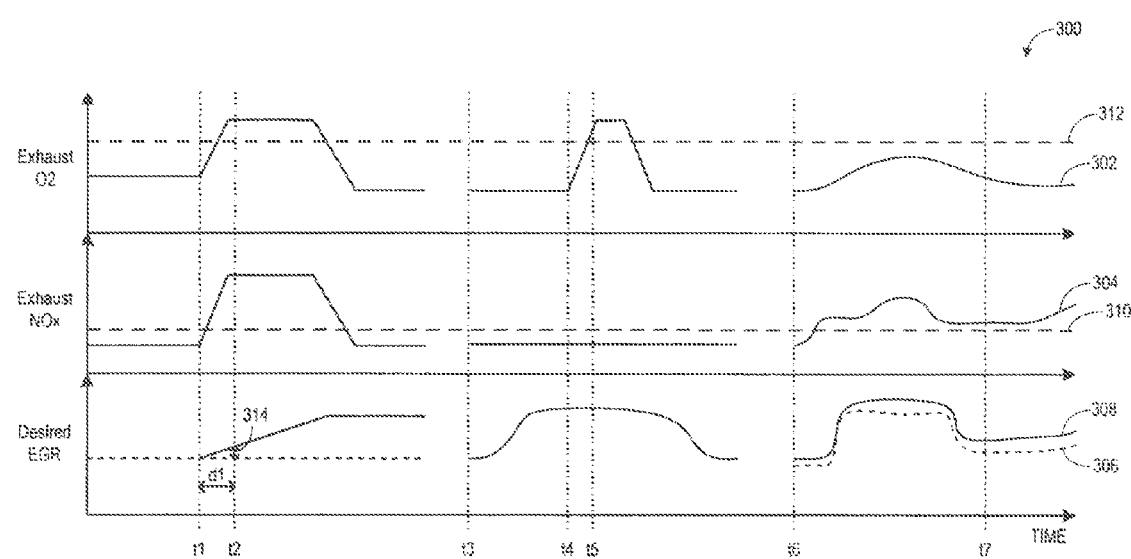
FIG. 3 shows a graph showing changes in exhaust gas recirculation responsive to changes in exhaust gas content, according to an embodiment of the invention.

Engine systems, such as the engine system shown in FIG. 1, may include a sensor positioned in an exhaust passage to measure NOx and oxygen content of exhaust gas. In some examples, one or more engine cylinders may experience insufficient combustion. One or more non-combusting engine cylinders may result in an increase in exhaust oxygen. Additionally, if the engine system includes an exhaust gas recirculation system (EGR) recirculating exhaust gas to an intake of the engine, one or more non-combusting dedicated EGR cylinders may result in an increase in NOx content of the exhaust gas. FIG. 2 shows a method for adjusting EGR based on engine operation and based on increases in NOx. If a sudden spike in exhaust oxygen and/or a change in a desired EGR rate from a first level due to engine operation to a second level due to an increase in NOx are detected, insufficient combustion of one or more engine cylinders may be indicated. FIG. 3 shows changes in EGR and exhaust gas content due to one or more non-combusting cylinders.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for diagnosing insufficient combustion of one or more engine cylinders, an example of a platform is disclosed in which the engine system may be installed in a vehicle, such as a rail vehicle. For example, FIG. 1 shows a block diagram of an embodiment of a vehicle system 100 (e.g., a locomotive system), herein depicted as a rail vehicle 106, configured to run on a rail 102 via a plurality of wheels 110. As depicted, the rail vehicle includes an engine 104. In other non-limiting embodiments, the engine may be a stationary engine, such as in a power-plant application, or an engine in a marine vessel or off-highway vehicle propulsion system as noted above.

The engine receives intake air for combustion from an intake, such as an intake manifold 115. The intake may be any suitable conduit or conduits through which gases flow to enter the engine. For example, the intake may include the intake manifold, an intake passage 114, and the like. The intake passage receives ambient air from an air filter (not shown) that filters air from outside of a vehicle in which the engine may be positioned. Exhaust gas resulting from combustion in the engine is supplied to an exhaust, such as exhaust passage 116. The exhaust may be any suitable conduit through which gases flow from the engine. For example, the exhaust may include an exhaust manifold 117, the exhaust passage, and the like. Exhaust gas flows through the exhaust passage, and out of an exhaust stack of the rail vehicle. In one example, the engine is a diesel engine that combusts air and diesel fuel through compression ignition. In other non-limiting embodiments, the engine may combust fuel including gasoline, kerosene, biodiesel, or other petroleum distillates of similar density through compression ignition (and/or spark ignition).

In one embodiment, the rail vehicle is a diesel-electric vehicle. As depicted in FIG. 1, the engine is coupled to an electric power generation system, which includes an alternator/generator 140 and electric traction motors 112. For example, the engine is a diesel engine that generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to a plurality of traction motors and the alternator/generator may provide electrical power to the plurality of fraction motors. As depicted, the plurality of traction motors are each connected to one of a plurality of wheels to provide tractive power to propel the rail vehicle. One example configuration includes one traction motor per wheel. As depicted herein, six pairs of traction motors correspond to each of six pairs of wheels of the rail vehicle. In another example, alternator/generator may be coupled to one or more resistive grids 142. The resistive grids may be configured to dissipate excess engine torque via heat produced by the grids from electricity generated by alternator/generator.

In the embodiment depicted in FIG. 1, the engine is a V-12 engine having twelve cylinders. In other examples, the engine may be a V-6, V-8, V-10, V-16, I-4, I-6, I-8, opposed 4, or another engine type. As depicted, the engine includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 1, the non-donor cylinders are coupled to the exhaust passage to route exhaust gas from the engine to atmosphere (after it passes through an exhaust gas treatment system 130 and first and second turbochargers 120 and 124). The donor cylinders, which provide engine exhaust gas recirculation (EGR), are coupled exclusively to an EGR passage 162 of an EGR system 160 which routes exhaust gas from the donor cylinders to the intake passage of the engine, and not to atmosphere. By introducing cooled exhaust gas to the engine, the amount of available oxygen for combustion is decreased, thereby reducing combustion flame temperatures and reducing the formation of nitrogen oxides (e.g., $NO_x$).

Exhaust gas flowing from the donor cylinders to the intake passage passes through a heat exchanger such as an EGR cooler 166 to reduce a temperature of (e.g., cool) the exhaust gas before the exhaust gas returns to the intake passage. The EGR cooler may be an air-to-liquid heat exchanger, for example. In such an example, one or more charge air coolers 132 and 134 disposed in the intake passage (e.g., upstream of where the recirculated exhaust gas enters) may be adjusted to further increase cooling of the charge air such that a mixture temperature of charge air and exhaust gas is maintained at a desired temperature. In other examples, the EGR system may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage rather than the intake passage.

Additionally, in some embodiments, the EGR system may include an EGR bypass passage 161 that is configured to divert exhaust from the donor cylinders back to the exhaust passage. The EGR bypass passage may be controlled via a first valve 163. The first valve may be configured with a plurality of restriction points such that a variable amount of exhaust is routed to the exhaust, in order to provide a variable amount of EGR to the intake.

In an alternate embodiment shown in FIG. 1, the donor cylinders may be coupled to an alternate EGR passage 165 (illustrated by the dashed lines) that is configured to selectively route exhaust to the intake or to the exhaust passage. For example, when a second valve 170 is open, exhaust may be routed from the donor cylinders to the EGR cooler and/or additional elements prior to being routed to the intake passage. Further, the alternate EGR system includes a third valve 164 disposed between the exhaust passage and the alternate EGR passage.

The third valve and second valve may be on/off valves controlled by the control unit 180 (for turning the flow of EGR on or off), or they may control a variable amount of EGR, for example. In some examples, the third valve may be actuated such that an EGR amount is reduced (exhaust gas flows from the alternate EGR passage to the exhaust passage). In other examples, the third valve may be actuated such that the EGR amount is increased (e.g., exhaust gas flows from the exhaust passage to the alternate EGR passage). In some embodiments, the alternate EGR system may include a plurality of EGR valves or other flow control elements to control the amount of EGR.

In such a configuration, the third valve 164 is operable to route exhaust from the donor cylinders to the exhaust passage of the engine and the second valve 170 is operable to route exhaust from the donor cylinders to the intake passage of the engine. As such, the third valve may be referred to as an EGR bypass valve, while the second valve may be referred to as an EGR metering valve. In the embodiment shown in FIG. 1, the third valve and the second valve may be engine oil, or hydraulically, actuated valves, for example, with a shuttle valve (not shown) to modulate the engine oil. In some examples, the valves may be actuated such that one of the third and second valves is normally open and the other is normally closed. In other examples, the third and second valves may be pneumatic valves, electric valves, or another suitable valve.

As shown in FIG. 1, the vehicle system further includes an EGR mixer 172 which mixes the recirculated exhaust gas with charge air such that the exhaust gas may be evenly distributed within the charge air and exhaust gas mixture. In the embodiment depicted in FIG. 1, the EGR system is a high-pressure EGR system which routes exhaust gas from a location upstream of the turbochargers in the exhaust passage to a location downstream of the turbochargers in the intake passage. In other embodiments, the vehicle system may additionally or alternatively include a low-pressure EGR system which routes exhaust gas from downstream of the turbochargers in the exhaust passage to a location upstream of the turbochargers in the intake passage.

As depicted in FIG. 1, the vehicle system further includes a two-stage turbocharger with the first turbocharger 120 and the second turbocharger 124 arranged in series, each of the turbochargers arranged between the intake passage and the exhaust passage. The two-stage turbocharger increases air charge of ambient air drawn into the intake passage in order to provide greater charge density during combustion to increase power output and/or engine-operating efficiency. The first turbocharger operates at a relatively lower pressure, and includes a first turbine 121 which drives a first compressor 122. The first turbine and the first compressor are mechanically coupled via a first shaft 123. The first turbocharger may be referred to the "low-pressure stage" of the turbocharger. The second turbocharger operates at a relatively higher pressure, and includes a second turbine 125 which drives a second compressor 126. The second turbocharger may be referred to the "high-pressure stage" of the turbocharger. The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one example, three turbochargers are used in series. In another example, only two turbochargers are used in series.

In the embodiment shown in FIG. 1, the second turbocharger is provided with a turbine bypass valve 128 which allows exhaust gas to bypass the second turbocharger. The turbine bypass valve may be opened, for example, to divert the exhaust gas flow away from the second turbine. In this manner, the rotating speed of the second compressor, and thus the boost provided by the turbochargers to the engine may be regulated during steady state conditions. Additionally, the first turbocharger may also be provided with a turbine bypass valve. In other embodiments, only the first turbocharger may be provided with a turbine bypass valve, or only the second turbocharger may be provided with a turbine bypass valve. Additionally, the second turbocharger may be provided with a compressor bypass valve 129, which allows gas to bypass the second compressor 126 to avoid compressor surge, for example. In some embodiments, the first turbocharger may also be provided with a compressor bypass valve, while in other embodiments, only first turbocharger may be provided with a compressor bypass valve.

The vehicle system further includes the exhaust treatment system coupled in the exhaust passage in order to reduce regulated emissions. As depicted in FIG. 1, the exhaust gas treatment system is disposed downstream of the first turbine of the first (low pressure) turbocharger. In other embodiments, an exhaust gas treatment system may be additionally or alternatively disposed upstream of the first turbocharger. The exhaust gas treatment system may include one or more components. For example, the exhaust gas treatment system may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof. In alternate embodiments, the vehicle system may not include the exhaust aftertreatment system.

The exhaust passage further includes an exhaust gas sensor 190. The exhaust gas sensor measures an exhaust emission value (e.g., level) of the exhaust gas. For example, the exhaust gas sensor may measure a content of the exhaust gas. In one example, the exhaust emission value may be an amount of oxygen and/or NOx in the exhaust gas. As such, the exhaust gas sensor may measure both an oxygen and NOx level of the exhaust gas flowing through the exhaust passage. In another example, the exhaust passage may include two exhaust gas sensors, a first measuring exhaust oxygen content and a second measuring exhaust NOx content. The exhaust gas sensor is shown positioned downstream from the turbochargers and upstream of the exhaust gas treatment system. However, in alternate embodiments the exhaust gas sensor may be positioned in alternate locations in the exhaust passage, such as upstream of the turbochargers or between the two turbocharger stages. In one example, the exhaust gas sensor may be a universal exhaust gas oxygen sensor (UEGO) or another appropriate exhaust constituent sensor.

The vehicle system further includes the control unit, which is provided and configured to control various components related to the vehicle system. In one example, the control unit includes a computer control system (e.g., a controller). The control unit further includes non-transitory, computer readable storage media (not shown) including code for enabling on-board monitoring and control of engine operation. The control unit, while overseeing control and management of the vehicle system, may be configured to receive signals from a variety of engine sensors, as further elaborated herein, in order to determine operating parameters and operating conditions, and correspondingly adjust various engine actuators to control operation of the vehicle system. For example, the control unit may receive signals from various engine sensors including sensor 181 arranged in the inlet of the high-pressure turbine, sensor 182 arranged in the inlet of the low-pressure turbine, sensor 183 arranged in the inlet of the low-pressure compressor, sensor 184 arranged in the inlet of the high-pressure compressor, and the exhaust gas sensor. The sensors arranged in the inlets of the turbochargers may detect air temperature and/or pressure. Additional sensors may include, but are not limited to, engine speed, engine load, boost pressure, ambient pressure, exhaust temperature, exhaust pressure, etc. Correspondingly, the control unit may control the vehicle system by sending commands to various components such as traction motors, alternator, cylinder valves, throttle, heat exchangers, wastegates or other valves or flow control elements, etc.

In one example, the engine controller may adjust engine operation based on an output of the exhaust gas sensor. The exhaust gas sensor output may include a NOx level and/or oxygen level of the exhaust gas. If the exhaust NOx level and/or oxygen level differs from a NOx reference (e.g., set point) or oxygen reference, the engine controller may adjust engine operation in order to maintain the NOx and/or oxygen levels at the respective set points. In one example, if NOx increases above the NOx reference (e.g., target NOx level), the controller may adjust EGR (e.g., increase EGR) in order to reduce the NOx.

In some embodiments, one or more engine cylinders may experience insufficient combustion, thereby resulting in cylinder cut-out where combustion may not occur. As a result, the non-combusting cylinder may output increased oxygen to the exhaust passage. Further, if the non-combusting cylinder is a donor cylinder recirculating exhaust to the intake passage, an increased amount of oxygen may be output to the intake passage. Thus, the remaining combusting cylinders may operate with increased oxygen, thereby resulting in more NOx in the exhaust gas. Thus, if the engine is operating with EGR and one or more of the donor cylinders experience insufficient combustion, an increase in NOx and oxygen in the exhaust gas may indicate one or more non-combusting cylinders. Further, the controller may increase the EGR rate responsive to the increase in NOx in order to compensate for the non-combusting cylinder which may output increased oxygen to the engine intake. In this way, insufficient combustion may also be indicated responsive to a change in EGR due to NOx that is different than a change in EGR due to normal engine operating conditions (e.g., engine speed and/or load)

In this way, an engine system may include a donor cylinder group selectively routing exhaust to an intake passage of the engine, a non-donor cylinder group routing exhaust to an exhaust passage of the engine, and an exhaust gas sensor measuring one or more of a NOx level or oxygen level of the exhaust gas flowing through the exhaust passage. The engine may also include one or more fuel injectors coupled to each engine cylinder. As such, the system of FIG. 1 provides for a controller configured to adjust an amount of exhaust gas recirculation (EGR) flow provided by a donor cylinder group of an engine based on a change in a sensed or calculated NOx level relative to a NOx reference value and indicate a condition of one or more of the plurality of fuel injectors that are coupled to the engine based at least in part on the amount of adjustment of the EGR flow.

The controller is further configured to increase the EGR flow based on the NOx level increasing above the NOx reference value. Additionally, the controller is configured to indicate a condition of one or more of the plurality of fuel injectors based on a sudden increase in a measured exhaust oxygen level over a threshold amount. In one example, the condition may include degradation of one or more of the plurality of fuel injectors. Degradation of one or more fuel injectors may result in cylinder cut out where the affected cylinder pumps air and does not combust fuel.

Turning to FIG. 2, a method 200 is shown for indicating insufficient combustion of one or more engine cylinders based on an amount by with EGR is adjusted in response to an exhaust emission value. Instructions for carrying method 200 may be stored in a memory of a controller, such as a controller included in the control system 180 shown in FIG. 1. As such, the controller may execute method 200 according to the stored instructions.

The method begins at 202 by estimating and/or measuring engine operating conditions. Engine operating conditions include engine speed and load, exhaust NOx level, exhaust oxygen level, EGR flow, or the like. At 204, the method includes determining if EGR is enabled (e.g., flowing). If EGR is enabled at least a portion of exhaust from engine cylinders (e.g., donor cylinders) is recirculated to the engine intake. If EGR is flowing, the method continues to 206 to adjust EGR flow (e.g., recirculated exhaust gas) to a first level based on engine operating conditions. In one example, the method at 206 may include adjusting one or more EGR valves to adjust EGR flow to the desired first level based on engine speed and/or engine load. In an alternate example, the controller may adjust the one or more EGR valves to adjust the amount of exhaust gas being recirculated to the intake passage based on alternative or additional engine operating conditions.

At 208, the method includes determining whether the NOx level of the exhaust gas is greater than a threshold NOx level. In one example, the threshold NOx level may be a threshold amount above a target NOx level (e.g., NOx reference or set point). In another example, the threshold NOx level may be substantially equal to the target NOx level, the target NOx level being a desired NOx level based on emission standards. Additionally, the NOx level of the exhaust gas may be estimated and/or measured based on an output of an exhaust gas sensor (such as the exhaust gas sensor 190 shown in FIG. 1). If the NOx level of the exhaust gas flowing through the exhaust passage is greater than the threshold NOx level, the method continues to 210 to adjust EGR flow to a second level based on the determined NOx level. The second level may be different than the first level. In one example, the second level may be greater than the first level. Additionally, the method at 210 may including adjusting the EGR flow to the second level based on the determined NOx level and not based on engine speed and load.

At 212, the controller may determine if a difference between the second EGR level and the first EGR level is greater than a threshold difference. In one example, the threshold difference may be an average deviation amount between the second level and first level over a duration of time (e.g., a measurement duration, a duration of engine operation, or the like). In this way, the threshold difference may be a threshold deviation amount. Said another way, the method at 212 may include determining if a difference between a first desired EGR level based on engine speed and/or load and a second desired EGR level based on an exhaust emission level (e.g., NOx level) and not based on engine speed and/or load is greater than a threshold difference. If the difference between the second EGR level and the first EGR level is not greater than the threshold deviation amount, the method continues to 214 to maintain engine operation and not indicate insufficient combustion of one or more engine cylinders. Alternatively, if the difference between the second EGR level and the first EGR level is greater than the threshold difference, the method continues on to 216 to indicate insufficient combustion of one or more donor cylinders (e.g., one or more dedicated engine cylinders routing exhaust to the intake passage). In one embodiment, the controller may determine a number of cylinders experiencing insufficient combustion based on the amount by which EGR is adjusted, by the difference between the second and first EGR levels, and/or by the increase in NOx level. For example, as the difference between the second and first EGR levels increases, more donor cylinders may not be combusting and may have degraded fuel injectors. As such, an estimate of the number of non-combusting cylinders may be determined, thereby further aiding in diagnosis of the engine system.

In one example, indicating insufficient combustion at 216 may include alerting a vehicle operator via a visual or audible alert than one or more engine cylinders has experienced insufficient combustion. For example, the controller may send a signal to a display screen of the vehicle alerting the vehicle operator than one or more engine cylinders experienced insufficient combustion and thus one or more fuel injectors may be degraded. In another example, indicating insufficient combustion at 216 may include setting a diagnostic flag within a memory of the controller. The controller may then run a diagnostic routine to further diagnose the one or more indicated cylinders responsive to the diagnostic flag. In yet another example, the indicating insufficient combustion at 216 may include storing in a memory of the controller an indication of insufficient combustion including which cylinder or set of cylinders was indicated and any other engine operational data during the indication. Maintenance personnel may then later access this stored data and diagnose and/or repair the indicated engine cylinders.

Returning to 208, if the exhaust NOx level is not greater than the threshold NOx level, the method continues to 218 to determine whether the level of oxygen in the exhaust gas is greater than a threshold oxygen level. As discussed above, the exhaust oxygen level may be estimated and/or measured based on an output of an exhaust gas sensor positioned in an exhaust passage downstream from where an EGR passage couples to the exhaust passage. A sudden increase in exhaust oxygen may indicate one or more cylinders have not fully combusted (e.g., due to a degraded fuel injector). In one example, the threshold oxygen level may be a threshold increase in exhaust oxygen over a duration (e.g., a threshold duration). The duration may be shorter than a time it takes for the controller to adjust fuel injection based on the increase in exhaust oxygen. Thus, if the exhaust oxygen level is greater than the threshold oxygen level, the method continues to 220 to indicate insufficient combustion of one or more non-donor cylinders. Since the NOx level of the exhaust gas is below the NOx threshold and the oxygen level of the exhaust gas is above the oxygen threshold, it may be determined that the one or more cylinders that experienced insufficient combustion is a non-donor cylinder and not a donor cylinder. In this way, the controller may differentiate which type of cylinder (e.g., donor vs. non-donor) has experienced insufficient combustion based on the exhaust emission levels (NOx and oxygen) and which of the oxygen and NOx emission levels are above their respective thresholds. This may enable the controller or a service personnel to more quickly repair a degraded fuel injector or other cylinder component that may have caused the cylinder cut out or insufficient combustion event.

Returning to 218, if the exhaust oxygen level is not greater than the threshold level, the method continues to 226 to maintain engine operation and not indicate insufficient combustion of any engine cylinders. In one example, the method at 226 may include indicating a condition of the fuel injectors. The condition of the fuel injectors may include the fuel injectors injecting as required and not being degraded.

Returning to 204, if EGR is disabled such that no EGR is flowing from the donor cylinders to the intake manifold, the method proceeds to 222 to determine if a level of oxygen in the exhaust gas is greater than the threshold oxygen level. If the exhaust oxygen level is greater than the threshold level over the threshold duration (as explained at 218 above), the method includes indicating insufficient combustion of one or more engine cylinders at 224. As described above, indicating insufficient combustion may include indicating a condition of one or more fuel injectors coupled to the one or more engine cylinders, the condition including degradation and/or improper injection. Additionally, the method at 224 and/or 220 may include increasing fuel injection in the non-degraded (or combusting) engine cylinders in response to the increase in the oxygen content of the exhaust gas.

FIG. 3 shows a graphical example of changes in exhaust gas recirculation responsive to changes in exhaust gas content. More specifically, graph 300 shows changes in exhaust oxygen content at plot 302, changes in exhaust NOx content at plot 304, changes in a first desired level of EGR based on one or more of engine speed and load at plot 306, and changes in a second desired level of EGR based on the exhaust NOx level at plot 308. In one example, the exhaust oxygen content and the exhaust NOx content may be measured by one or more exhaust gas sensors positioned in an exhaust passage of the engine. A controller may then determine a first desired EGR flow rate based on engine speed and/or load and a second desired EGR flow rate based on the NOx level. In one example, the first desired EGR flow rate may be based on engine speed and/or load only and the second desired EGR flow rate may be based on the exhaust NOx level only (and not engine speed and load). The controller may then adjust a position of one or more EGR valves to adjust the EGR flow to either the first or second desired level based on how much the two desired EGR flows differ from one another.

Prior to time t1, the first desired EGR level based on engine operation (e.g., engine speed and/or load) and the second desired EGR level based on the exhaust NOx level are approximately the same (plots 306 and 308). Further, EGR may be adjusted only based on engine operation and not based on NOx since the exhaust NOx level is within a threshold of its target level and/or below the upper threshold level 310. Additionally, the exhaust oxygen level may be below its respective upper threshold level 312 (or within a threshold of its target level). At time t1 one of the donor cylinders may cut out (e.g., due to a degraded fuel injector coupled to that cylinder), thereby resulting in insufficient combustion. As a result, the EGR system may recirculate more oxygen, thereby increasing the levels of oxygen and NOx in the exhaust gas (plots 302 and 304). In response to the increasing exhaust NOx level, the second desired EGR level based on NOx (plot 308) may increase relative to the first desired EGR level based on engine operating conditions other than exhaust NOx content (e.g., engine speed and load, as shown at plot 306). As such, the controller may adjust the EGR rate to the second desired level in order to maintain the exhaust NOx level at the target NOx level and/or below an upper threshold NOx level 310. At time t2, the difference between the second EGR level and the first EGR level, as indicated at 314, may be greater than a threshold amount over a duration, dl. As a result, the controller may indicate insufficient combustion of one or more donor cylinders at time t2.

After a period of time, as shown at time t3, the exhaust NOx and oxygen levels may again be below their respective upper thresholds. Additionally, since the exhaust NOx level is below the upper threshold NOx level 310, the controller may be adjusting EGR based on engine operation such as engine speed and load. At time t4 one or more non-donor cylinders may cut out and experience insufficient combustion. As a result, there may be a sudden increase in exhaust oxygen content over the threshold oxygen level 312 at time t5. In response to the sudden increase in the exhaust oxygen level while NOx remains below the upper threshold NOx level 310, the controller may indicate insufficient combustion of one or more non-donor cylinders. In one example, this may include possible degradation of one or more fuel injectors coupled to the one or more non-donor cylinders. Diagnostic routines may then be directed toward diagnosing one or more of the non-donor cylinders and not toward the donor cylinders.

After another period of time, as shown at time t6, one or more donor cylinders may experience intermittent or varying degrees of insufficient combustion. As a result, the NOx level of the exhaust gas may fluctuate and increase above the upper threshold NOx level 310. In response to the changing exhaust NOx level over the upper threshold NOx level 310, the controller may adjust the EGR rate to the second desired EGR rate (plot 308). As the NOx level fluctuates and engine operation changes, the difference between the first desired EGR level (plot 306) and the second desired EGR level (plot 308) may also fluctuate. Over a duration, the average deviation amount between the first and second desired EGR rates may be greater than a threshold deviation amount. Thus, after the duration at time t7, the controller may indicate insufficient combustion of one or more donor cylinders.

In this way, one or more engine cylinders experiencing insufficient combustion may be diagnosed based on adjustments to EGR flow based on an exhaust NOx level. Additionally, which cylinder e.g., which type of cylinder, non-donor vs. donor) is experiencing insufficient combustion may be determined based which of the NOx and oxygen levels are increasing. In this way, the controller may differentiate between insufficient donor cylinder combustion and insufficient non-donor cylinder combustion. For example, when a deviation amount between a first EGR level based on engine operation and a second EGR level based on the exhaust NOx level is greater than a threshold deviation amount, an engine controller may indicate insufficient combustion of one or more donor cylinders. In another example, when there is a sudden increase in exhaust oxygen content while the exhaust NOx content remains within a threshold range and/or the deviation amount between the desired EGR level based on NOx and the desired EGR level based on engine operation is not above the threshold, the controller may indicated insufficient combustion of one or more non-donor cylinders.

A technical effect of diagnosing insufficient combustion of one or more engine cylinders is achieved by determining an amount of adjustment to recirculated exhaust gas responsive to an exhaust emission value. By diagnosing insufficient combustion of one or more engine cylinders based on exhaust emission levels and/or adjustments to EGR, the engine may diagnose degraded cylinder components (such as degraded fuel injectors) without the need of extra dedicated sensors and control routines, thereby decreasing engine costs. Additionally, by determining which cylinder (or which type of cylinder) is experiencing insufficient combustion, the engine controller may more quickly diagnose and repair the degraded component. For example, fewer diagnostic routines may need to be run when it may be determined which cylinder bank (donor vs. non-donor) is experiencing insufficient combustion. Further, by more quickly diagnosing the degraded component, fuel efficiency may be increased by reducing the time the engine operates with the one or more non-combusting cylinders.

As one embodiment, a method for an engine comprises adjusting recirculated exhaust gas responsive to a determined emission value and indicating insufficient combustion of one or more engine cylinders based on an amount by which the recirculated exhaust gas is adjusted. In one example, the determined emission value is a determined NOx level and the amount by which the recirculated exhaust gas is adjusted is an amount adjusted over a set duration. Additionally, adjusting recirculated exhaust gas includes adjusting an EGR rate to maintain the determined NOx level at a target NOx level in response to the determined NOx level increasing above a threshold NOx level, the threshold NOx level being a threshold amount above the target NOx level.

As one example, indicating insufficient combustion includes indicating insufficient combustion when the amount by which the recirculated exhaust gas is adjusted is greater than a threshold increase in the recirculated exhaust gas. The method may further comprise not indicating insufficient combustion of one more engine cylinders when the amount by which the recirculated exhaust gas is adjusted is less than the threshold increase in the recirculated exhaust gas or when adjusting the recirculated exhaust gas includes decreasing an EGR rate.

The method further comprises adjusting the recirculated exhaust gas based on additional engine operating conditions, the additional engine operating conditions including one or more of engine load, engine speed, or turbine speed. Additionally, the method includes adjusting the recirculated exhaust gas based on the additional engine operating conditions and not the determined emission value when the determined emission value is within a threshold of a target emission value.

In another example, the method includes indicating insufficient combustion based on a sudden increase in oxygen content of engine exhaust over a threshold oxygen level. In yet another example, indicating insufficient combustion includes indicating one or more of complete cylinder cut out or fuel injector degradation.

As another embodiment, a method for an engine comprises during a first condition when an exhaust emission level is greater than a threshold exhaust emission level: adjusting a flow of recirculated exhaust gas to a first value based on one or more of engine speed and engine load, further adjusting the flow of recirculated exhaust gas to a second value based on the exhaust emission level, and indicating insufficient combustion of one or more engine cylinders based on a deviation amount between the second value and the first value. The method further comprises, during a second condition when the exhaust emission level is less than the threshold exhaust emission level, only adjusting the flow of recirculated exhaust gas to the first value.

In one example, the deviation amount is an average deviation amount between the second value and the first value over a duration and indicating insufficient combustion based on the deviation amount includes indicating insufficient combustion of one or more engine cylinders when the average deviation amount between the second value and the first value is greater than a threshold deviation amount. The method further comprises not indicating insufficient combustion when the average deviation amount between the second value and the first value is less than the threshold deviation amount.

As one example, the exhaust emission level is a NOx level measured by a sensor positioned in an exhaust passage of the engine and wherein adjusting the flow of recirculated exhaust gas includes adjusting an exhaust gas recirculation (EGR) rate of exhaust gases routed from engine cylinders to an intake manifold of the engine. Further, the threshold exhaust emission level is an exhaust emission level greater than a target exhaust emission level by a threshold amount of exhaust emissions. Additionally, further adjusting the flow of recirculated exhaust gas to a second value based on the exhaust emission level includes further adjusting the flow of recirculated exhaust gas to the second value based on a difference between an exhaust emission set-point and an actual exhaust emission level. As another example, indicating insufficient combustion includes indicating cylinder cut out of a number of one or more cylinders based on the deviation amount between the second value and the first value.

The method further comprises initiating a dead cylinder test to determine which cylinder is degraded responsive to indicating insufficient combustion of one or more cylinders. In another example, the exhaust emission level is an exhaust oxygen level measured by a sensor positioned in an exhaust passage of the engine and the method further comprises indicating insufficient combustion of one or more engine cylinders during the first condition when the exhaust oxygen level increases instantaneously by a threshold amount.

Another embodiment relates to a method for an engine (e.g., a method for controlling an engine). The method comprises adjusting recirculated exhaust gas based on a determined emission value, when the determined emission value is outside (i.e., not within) a threshold of a target emission value. The method further comprises adjusting the recirculated exhaust gas based on at least one engine operating condition and not the determined emission value when the determined emission value is within the threshold of the target emission value. The at least one additional engine operating condition includes one or more of engine load, engine speed, or turbine speed. The method further comprises indicating insufficient combustion of one or more engine cylinders based on an amount by which the recirculated exhaust gas is adjusted.

In another embodiment, a system for an engine comprises a controller. (The controller may be configured to be electrically coupled to the engine, for controlling the engine and/or for receiving information from engine sensors.) The controller is configured to adjust recirculated exhaust gas (e.g., by controlling one or more valves) responsive to a determined emission value, and to indicate insufficient combustion of one or more engine cylinders based on an amount by which the recirculated exhaust gas is adjusted.

In another embodiment, a system for an engine comprises a controller. (The controller may be configured to be electrically coupled to the engine, for controlling the engine and/or for receiving information from engine sensors.) The controller is configured to, during a first condition when an exhaust emission level is greater than a threshold exhaust emission level: adjust a flow of recirculated exhaust gas (e.g., by controlling one or more valves) to a first value based on one or more of engine speed or engine load; further adjust the flow of recirculated exhaust gas to a second value based on the exhaust emission level; and indicate insufficient combustion of one or more engine cylinders based on a deviation amount between the second value and the first value. The controller is further configured to, during a second condition when the exhaust emission level is less than the threshold exhaust emission level, only adjust the flow of recirculated exhaust gas (e.g., by controlling the one or more valves) to the first value.

As discussed, embodiments relate to methods and systems for an engine, which comprise adjusting recirculated exhaust gas responsive to a determined emission value, and indicating insufficient combustion of one or more engine cylinders based on an amount by which the recirculated exhaust gas is adjusted. The determined emission value may be determined based on receiving information from an engine sensor during operation of the engine, and/or it may be determined as an estimation or calculation based on a current operating mode of the engine, a configuration of the engine, historical data of engine performance, a model of engine operational performance, and/or the like. Indicating the insufficient combustion may include electrically communicating one or more signals, containing information of the insufficient combustion, to one or more of an onboard vehicle system (e.g., the engine is onboard the vehicle), to an off-board system (e.g., the engine is onboard the vehicle and the signals are communicated from onboard the vehicle to the off-board system), to a system or a sub-system that is part of the engine, or the like. The signals may be used to control the engine, a vehicle (e.g., in which the engine is located), or another system. For example, in one embodiment, the engine is controlled based on the signals, to transition from a first mode of operation to a second, different mode of operation (such as engine shutdown, or operating the engine to avoid use of cylinders or cylinder groups that are identified as being associated with the insufficient combustion). In another example, a vehicle is controlled based on (and responsive to) the signals, to operate in a designated mode of operation for travel along a route. In another example, maintenance on the engine is automatically scheduled (e.g., by a control system having a processor) based on the signals. In another example, a display screen is controlled based on the signals, to show the indicated insufficient combustion on the display screen, e.g., to an operator or user. In another example, a memory unit is controlled to store the signals or information in the signals.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for an engine, comprising:
adjusting recirculated exhaust gas responsive to a determined emission value;
determining a number of cylinders out of a plurality of engine cylinders that are experiencing insufficient combustion based on an amount by which the recirculated exhaust gas is adjusted, where the determined number is a subset of the plurality of engine cylinders;
indicating insufficient combustion of the determined number of cylinders; and
and at least one of:
indicating to a user insufficient combustion of a greater number of cylinders as the amount by which the recirculated exhaust gas is adjusted increases
or, adjusting the engine based on insufficient combustion of a greater number of cylinders as the amount by which the recirculated exhaust gas is adjusted increases.

2. The method of claim 1, wherein the determined emission value is a determined NOx level and wherein the amount by which the recirculated exhaust gas is adjusted is an amount adjusted over a set duration and wherein adjusting the recirculated exhaust gas includes adjusting an exhaust gas recirculation rate to maintain the determined NOx level at a target NOx level in response to the determined NOx level increasing above a threshold NOx level, the threshold NOx level being a threshold amount above the target NOx level.

3. The method of claim 1, wherein indicating insufficient combustion includes indicating insufficient combustion in response to the amount by which the recirculated exhaust gas is adjusted being greater than a threshold increase in the recirculated exhaust gas, wherein indicating insufficient combustion includes one or more of alerting a vehicle operator, setting a diagnostic flag, or storing an indication of insufficient combustion in a memory of a controller of the engine, and wherein the determined number of cylinders that are experiencing insufficient combustion are non-combusting cylinders.

4. The method of claim 3, further comprising not indicating insufficient combustion of one or more engine cylinders in response to the amount by which the recirculated exhaust gas is adjusted being less than the threshold increase in the recirculated exhaust gas or when adjusting the recirculated exhaust gas includes decreasing an exhaust gas recirculation rate.

5. The method of claim 1, further comprising adjusting the recirculated exhaust gas based on additional engine operating conditions, the additional engine operating conditions including one or more of engine load, engine speed, or turbine speed.

6. The method of claim 5, further comprising adjusting the recirculated exhaust gas based on the additional engine operating conditions and not the determined emission value when the determined emission value is within a threshold of a target emission value.

7. The method of claim 1, further comprising indicating insufficient combustion based on an increase in oxygen content of engine exhaust over a threshold oxygen level in a threshold duration.

8. The method of claim 1, wherein indicating insufficient combustion includes indicating one or more of complete cylinder cut out or fuel injector degradation.

9. A method for an engine, comprising:
during a first condition when an exhaust emission level is greater than a threshold exhaust emission level:
adjusting a flow of recirculated exhaust gas to a first value based on one or more of engine speed or engine load;
further adjusting the flow of recirculated exhaust gas to a second value based on the exhaust emission level; and
determining a number of non-combusting engine cylinders and indicating non-combustion in the determined number of engine cylinders based on a deviation amount between the second value and the first value, where the determined number of engine cylinders experiencing non-combustion increases as the deviation amount between the second value and the first value increases; and
during a second condition when the exhaust emission level is less than the threshold exhaust emission level, only adjusting the flow of recirculated exhaust gas to the first value.

10. The method of claim 9, wherein the deviation amount is an average deviation amount between the second value and the first value over a duration and wherein indicating non-combustion based on the deviation amount includes indicating non-combustion of one or more engine cylinders when the average deviation amount between the second value and the first value is greater than a threshold deviation amount.

11. The method of claim 10, further comprising not indicating non-combustion when the average deviation amount between the second value and the first value is less than the threshold deviation amount.

12. The method of claim 9, wherein the exhaust emission level is a NOx level measured by a sensor positioned in an exhaust passage of the engine and wherein adjusting the flow of recirculated exhaust gas includes adjusting an exhaust gas recirculation rate of exhaust gases routed from engine cylinders to an intake manifold of the engine.

13. The method of claim 9, wherein the threshold exhaust emission level is an exhaust emission level greater than a target exhaust emission level by a threshold amount of exhaust emissions.

14. The method of claim 9, wherein further adjusting the flow of recirculated exhaust gas to the second value based on the exhaust emission level includes further adjusting the flow of recirculated exhaust gas to the second value based on a difference between an exhaust emission set-point and an actual exhaust emission level and wherein indicating non-combustion includes indicating cylinder cut out of a number of one or more cylinders based on the deviation amount between the second value and the first value.

15. The method of claim 9, further comprising initiating a dead cylinder test to determine which cylinder is degraded responsive to indicating non-combustion of one or more cylinders.

16. The method of claim 9, further comprising differentiating between non-combustion of one or more donor cylinders, the one or more donor cylinders part of a donor cylinder group coupled to an intake passage and configured to flow the recirculated exhaust gas to the intake passage, and one or more non-donor cylinders, the one or more non-donor cylinders part of a non-donor cylinder group coupled to an exhaust passage and configured to route exhaust gas to atmosphere, based on whether the exhaust emission level that is greater than the threshold exhaust emission level is a NOx level or an exhaust oxygen level measured by a sensor positioned in the exhaust passage, and further comprising indicating non-combustion of the one or more non-donor cylinders during the first condition when the exhaust oxygen level increases by a threshold amount within a threshold duration.

17. A system for an engine, comprising:
a plurality of donor cylinders coupled to an intake passage via an exhaust gas recirculation (EGR) passage;
a plurality of non-donor cylinders coupled to an exhaust passage; and
a controller configured to:
adjust an amount of EGR flow provided by the plurality of donor cylinders based on a change in a sensed or calculated NOx level relative to a NOx reference value;
indicate insufficient combustion of one or more of the plurality of donor cylinders in response to the amount of adjustment of the EGR flow being greater than a threshold increase in EGR flow; and
indicate insufficient combustion of one or more of the plurality of non-donor cylinders in response to a measured oxygen level in the exhaust passage increasing above a threshold oxygen level in a threshold duration.

18. The system of claim 17, wherein the controller is further configured to increase the EGR flow based on the NOx level increasing above the NOx reference value and wherein indicating insufficient combustion includes indicating a condition of one or more of a plurality of fuel injectors that are coupled to the engine.

19. The system of claim 18, wherein the controller is further configured to indicate a condition of one or more of the plurality of fuel injectors based on a sudden increase in the measured oxygen level over the threshold oxygen level, and wherein the controller is configured to indicate insufficient combustion of one or more of the plurality of non-donor cylinders and not indicate insufficient combustion of one or more of the plurality of donor cylinders in response to the measured oxygen level in the exhaust passage increasing above the threshold oxygen level in the threshold duration and the amount of adjustment of the EGR flow not being greater than the threshold increase in EGR flow.

20. The method of claim 1, wherein the determined number of cylinders are donor cylinders coupled to an intake passage and configured to flow the recirculated exhaust gas to the intake passage and further comprising differentiating between insufficient combustion of the donor cylinders and one or more non-donor cylinders of a non-donor cylinder group coupled to an exhaust passage and configured to route exhaust gas to atmosphere based on the determined emission value, the determined emission value including a NOx level and an oxygen level, and which of the determined oxygen and NOx levels are above respective thresholds.

\* \* \* \* \*